Oct. 14, 1958      F. A. GROTH      2,855,735
PACKAGING PROCESS
Filed May 2, 1955
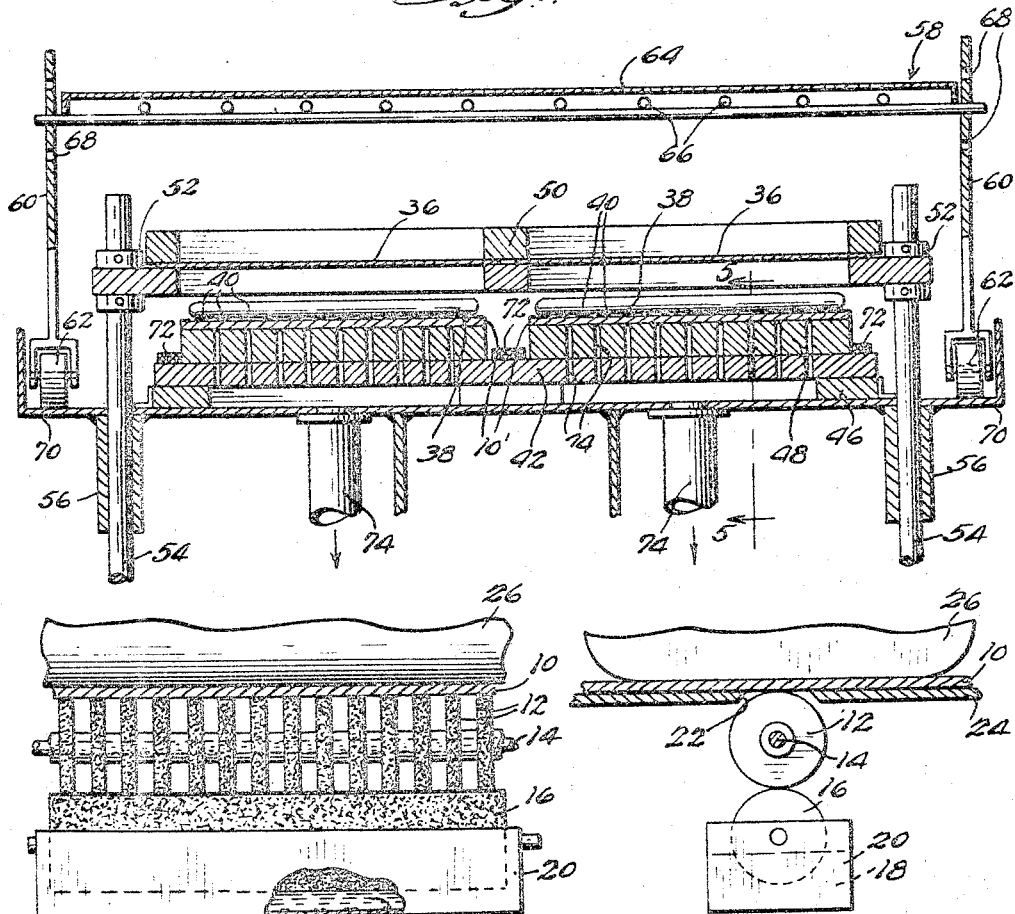
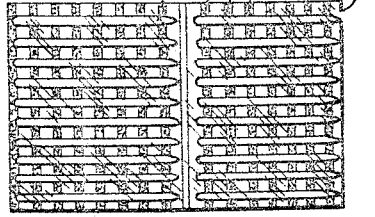
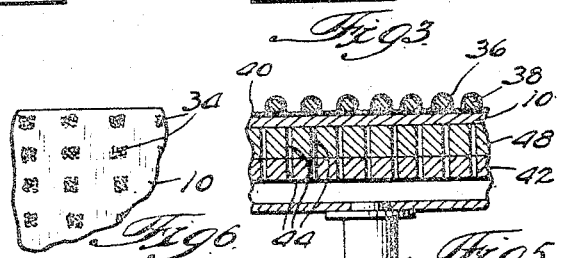
INVENTOR.
Fred A. Groth

United States Patent Office 2,855,735
Patented Oct. 14, 1958

2,855,735

PACKAGING PROCESS

Fred A. Groth, Chicago, Ill., assignor to Skin-Pack, Inc., Chicago, Ill., a corporation of Illinois Application May 2, 1955, Serial No. 505,357

10 Claims. (Cl. 53—22)

The present invention relates to an improved method of packaging articles, and, more particularly, relates to a method of packaging articles under a thermoplastic layer or skin.

Previous methods have heretofore been employed for packaging articles under a thermoplastic sheet but they have been open to one or more serious objections.

One method well known in the art consists of molding a plastic bubble which is, in turn, sealed about its periphery to a supporting member on which an article to be packaged is positioned. There are obvious disadvantages accompanying this process, such as the plurality of steps which adds materially to the expense of the final packaged product. In addition, the article to be packaged must be securely fastened by separate means to the supporting surface if movement thereon is to be avoided.

Another method employed in the art is one in which a heated thermoplastic sheet is drawn into tight engagement with an article to be packaged. The latter method comprises the steps of drilling a plurality of holes through the thickness of a supporting member, such as a cardboard panel, coating one surface of the supporting member with adhesive and placing the article to be packaged thereon. A heated thermoplastic sheet is then draped over the article and the air exhausted from between the sheet and the article by means of suction applied to the underside of the supporting member. The air is withdrawn solely through the holes since the adhesive coating functions as a barrier to the passage of air. The thermoplastic sheet is then cooled and allowed to harden, resulting in a package in which the plastic sheet is in skinlike engagement with the article.

However, it is again obvious that the drilling of holes is time-consuming and expensive and weakens the supporting structure as well as detracting from the general appearance thereof.

It is an object of this invention, therefore, to provide a process for packaging articles in skinlike engagement with an overlying thermoplastic sheet, which process may be readily effected in a minimum number of steps.

It is a further object of this invention to provide a manipulative process for packaging articles in tight engagement with a thermoplastic covering in which the adhesive coating is applied in a noncontinuous manner to a surface of an air-permeable supporting body whereby air may pass through the noncoated areas of the supporting body in the course of drawing the heated thermoplastic covering into tight engagement with the article to be covered.

It is a still further object of this invention to provide a method of packaging articles under a thermoplastic skin which is well adapted to the packaging of those articles which should not be exposed to the gases of the atmosphere.

It is another object of this invention to provide a method for packaging articles in which the final packaged article is visible to the buying public and also completely protected against dirt and contamination.

The above and other objects will become more apparent from the description, accompanying drawings and appended claims.

In carrying out one embodiment of the provided process a sheet of cardboard, or other material through which air may permeate when suction is applied to a surface thereof, is coated in strips or in any other non-continuous manner with an adhesive. An article to be packaged is placed on the adhesive coated surface and a heated thermoplastic sheet is draped over the article and air-permeable material. A seal is effected between the periphery of the cardboard sheet and the overlying plastic sheet. Suction is then applied to the uncoated surface of the cardboard sheet whereby the atmosphere trapped in the interface between the partially coated cardboard sheet and the opposed plastic sheet is withdrawn through the uncoated areas of the cardboard surface and the underlying interstices. The thermoplastic sheet is then drawn into skinlike engagement with the article and cardboard surfaces, cooled, and allowed to harden.

For a more complete understanding of this invention reference should now be given to the drawings, wherein:

Figure 1 is a fragmentary transverse-sectional view partly in elevation of an apparatus which may be employed in carrying out the process provided by this invention;

Fig. 2 is a fragmentary elevational view, partly in section, illustrating one means for applying adhesive to sheets of air-permeable matter;

Fig. 3 is an end elevational view of the apparatus illustrated in Fig. 2;

Fig. 4 is a top plan view of articles packaged in accordance with the process provided;

Fig. 5 is a fragmentary transverse-sectional view illustrating a plurality of packaged articles positioned on the apparatus illustrated in Fig. 1 and having a thermoplastic sheet in skinlike engagement therewith;

Fig. 6 is a fragmentary top plan view depicting an alternate method of applying adhesive to an air-permeable strip of material; and Fig. 7 illustrates in perspective an alternate means of applying adhesive to a sheet of air-permeable material.

Referring now, more particularly, to Figs. 2 and 3, an apparatus is illustrated which functions to apply adhesive in strips to a surface of an air-permeable material such as cardboard. Air-permeable material should be construed for purposes of the provided process as comprising any substantially stiff substance through which air may flow when suction is applied to one surface thereof. It is intended that cardboard be one of the more common materials to be employed with the provided process of this invention.

A cardboard sheet 10 illustrated in Fig. 2 may have strips of adhesive applied thereto by means of a series of rotating disc members 12 which are journalled on a rotating shaft 14. The peripheral portions of the rotating discs 12 diametrically opposed to the peripheral portions of the discs 12 contacting the sheet 10 engage an idle roller 16 which is partly submerged in adhesive 18 contained in a pan member 20. The rotatable shaft driven by a motive means (not shown) engages the idle roller 16, acquiring a film of adhesive which is, in turn, deposited on the air-permeable strip 10 passing across the rotating wheels 12. The adhesive is preferably heat sensitive and will harden at room temperature, thereby facilitating storage and handling thereof prior to the actual packaging operation. However, if the above-mentioned storage and handling problems are absent, adhesives other than the heat sensitive type will work to advantage, as will be made apparent in the following description.

Referring to Fig. 3, it will be noted that the rotating discs 12 contacting the idle roller 16 project through a cutout portion 22 of a table member 24, thereby enabling the uppermost peripheral portions of the discs 12 to tangentially contact the transversely moving continuous strip of cardboard 10 or other suitable air-permeable material. To insure adequate contact between the rotatable discs 12 and the cardboard 10, a hold-down member 26 is provided which may comprise a sheet metal member rounded at either end portion to slidably contact the underlying strip 10 and maintain the same in firm contact with the rotatable discs 12.

The applying of adhesive in noncontinuous layers, whereby uncoated areas of an air-permeable material result, comprises the essence of the process provided. It has been found that an adhesive clogs the pores of air-permeable substances such as cardboard, preventing the drawing of air through the interstices thereof when suction is applied to an opposed surface thereof. However, in the provided process, air may enter the interstices of the air-permeable material 10 through the uncoated portions which readily allow the passage of air.

An alternate method of enabling adhesive to be applied to a continuous strip of air-permeable material is illustrated in Fig. 6. An alternate means of application comprises a serrated disc 30, illustrated in Fig. 7, or a plurality thereof, journalled on a rotatable shaft 32 in precisely the same manner as the discs 12 illustrated in Figs. 2 and 3. The pattern of the adhesive disposed by the discs 30 is apparent from Fig. 6. Care should be taken, however, in the applying of adhesive to the strip, that upon heating of the heat-sensitive adhesive, the individual strips or spots 34 illustrated in Fig. 6, are not positioned so close to each other that they will flow so as to form an integral surface through which air may not pass.

It is the function of the adhesive coated on one surface of an air-permeable material, such as cardboard, to firmly secure thereto an overlying sheet of a thermoplastic material, such as cellulose acetate or any other thermoplastic which will not adversely react with the underlying articles over which it is positioned.

Referring now, more particularly, to Fig. 1, an apparatus for drawing a heated thermoplastic sheet 36 into skinlike engagement with a cardboard panel 10 and an article to be packaged 38 which is positioned on the particularly coated surface of the cardboard panel is illustrated. The articles 38 may comprise any article which is preferably visually inspected prior to purchase by the public. As will be noted from Fig. 4, the articles to be packaged 38 are positioned on cardboard panels which, in turn, have strips of adhesive 40 disposed thereon.

In the illustrated apparatus of Fig. 1, a platform 42 having air passageways 44 running through the thickness thereof is supported by a framework 46. Positioned atop the base member 42 are two mounting bases 48 also having air passageways 44 which are in alignment with the underlying passageways of the platform member 42. Clamping frame 50 is utilized for purposes of holding sheets of thermoplastic material of appropriate size which are adapted to cover the underlying cardboard panels 10', which have been cut from the larger strip 10, and the articles positioned thereon. The clamping frame 50 has affixed at transverse end portions thereof collar members 52 which are, in turn, securely affixed to reciprocally movable rod members 54. The latter members may be movable by hydraulic or other motive means and are intended to lower the heated thermoplastic sheet 36 into overlying relationship with the partially coated panels 10 and the articles positioned thereon. The rod members 54 are guided in their reciprocal movement by elongated collar members 56.

For heating the thermoplastic sheets 36 to the softening point whereby they assume a plastic condition, a movable oven 58 is provided comprising side walls 60 and a ceiling wall portion 64 containing a plurality of heating elements 66. The heating elements may be positioned at predetermined heights relative to the thermoplastic sheets by means of a plurality of apertures 68 positioned in the side walls 60 of the oven. Wheels 62 supporting the oven rotatably engage flange portions 70 of the illustrated apparatus and enable the oven to be readily removed from its overlying relationship with the articles to be packaged.

In the normal course of packaging operation two air-permeable panels 10 having strips of adhesive 40 or other discontinuous adhesive areas positioned on the top surfaces thereof are placed on the mounting bases 48. The cardboard panels 10 have positioned on the partially coated upper surfaces thereof one or more articles 38 which are to be packaged under plastic. The two thermoplastic sheets 36 are securely positioned in the clamping frame 50. The reciprocally movable oven 58 is then superposed over the thermoplastic sheets 36 and the underlying adhesive-coated panels 10. The heating elements 66 then emit sufficient heat to enable the thermoplastic sheets 36 to reach the softening point. With the thermoplastic sheets 36 in the above condition, the clamping frame 50 is lowered by means of the supporting rods 54 until the lower periphery of the clamping frame 50 effects a fluid seal with gasket members 72 disposed about the peripheries of the mounting bases 48. The oven 58 is withdrawn during the lowering movement. The thermoplastic sheets 36 are thus draped over the articles to be packaged 38 and the supporting panels 10. The heat content of the thermoplastic sheets is sufficient when in overlying relationship with the panels 10 to fluidize the adhesive. Immediately upon the effecting of a fluid seal between the clamping frame 50 and the gaskets 72, suction is applied to the bottom surface of the air-permeable panels 10 by means of the conduits 74 which are in communication with the bottom peripheries of the air-permeable panels 10 by means of the air passageways 44 positioned in both the platforms 42 and the mounting bases 48. Upon the application of the suction and withdrawal of the atmosphere from between the undersurface of the thermoplastic sheets 36 and the partially adhesive-coated surface of the air-permeable panels 10, the thermoplastic sheets are drawn into skinlike engagement with the upper surfaces of the articles 38 and the exposed upper surfaces of the air-permeable panels 10. It should be noted at this time that the withdrawal of the atmosphere above mentioned not only enables the thermoplastic sheets 36 to tightly engage the underlying articles and surfaces but, in addition, obviates the insulating effect of the air layer disposed over the heat sensitive coating on the strip 10. Consequently, the fluidizing of the heat sensitive adhesive is assured.

The final packaged end product illustrated in Fig. 5, positioned on the mounting base 48, still has the thermoplastic sheet peripheries clamped between the opposed members of the frame 50. Consequently, after the suction has been released, the thermoplastic sheet is allowed to cool and harden, whereby the thermoplastic sheets once again assume a rigid condition. The clamping frame 50 is then opened and the packaged articles are placed in a die cutter whereby appropriate trimming and cutting of the package assemblies may be effected.

It is thus seen that a novel process has been provided whereby an air-permeable supporting panel is partially coated with an adhesive and has a thermoplastic covering tightly drawn into skintight engagement therewith by means of suction which withdraws the atmosphere from between the articles and the overlying thermoplastic sheet. The process results in an end product which is pleasing in appearance and thus has increased sales appeal. The process is also readily adaptable to the packaging of materials which should be kept out of contact with the gases of the atmosphere.

Although the apparatus illustrated in carrying out the provided process is that disclosed in my co-pending application, Serial No. 439,423, filed June 25, 1954, now Patent No. 2,832,094, it is obvious that other apparatus may be utilized in carrying out various steps. It is intended that any thermoplastic material be utilized which does not deleteriously react with the articles to be packaged, or the supporting surface. The heat sensitive adhesive should be hardenable at the ordinary temperatures at which the article will be stored, and should also be one which will enable the thermoplastic sheet to fixedly adhere to the supporting surface. Should advertising matter be printed on the supporting surface, it is also desirable that the adhesive be transparent. In addition, it is not essential that the adhesive be placed on the supporting strip before the positioning of the article to be packaged thereon. In some instances it may be more desirable for purposes of expediency or other reasons to first position the article on the coated supporting strip and, subsequently, place the discontinuous coating of adhesive on the remaining surface of the supporting strip or on both the article and the remaining surface. It may also be desirable for purposes of expediency or other reasons to first coat the entire supporting surface of the air-permeable member and then remove a portion of the coating therefrom to provide air passageways. It is intended that this method for effecting a noncontinuous layer be within the inventive spirit of the disclosed process. Sufficient adhesive should be placed on the panels 10 to insure fixed engagement therewith of the overlying thermoplastic sheets, and sufficient uncoated areas of the partially coated panel surfaces should be available for the trapped air to readily escape. It is apparent that uncoated areas of a small magnitude allow entrapped air to be drawn therethrough.

It is thus seen from the above that a variety of modifications in the above presented process may be made without departing from the basic inventive concept disclosed. This invention is to be limited, therefore, only by the scope of the appended claims.

I claim:

1. A process for the packaging of articles comprising the steps of applying a noncontinuous layer of adhesive to a surface of, a porous panel, placing the articles to be packaged on said panel surface having adhesive thereon, at least a portion of said surface disposed beneath said articles being air permeable, draping a heated thermoplastic sheet over said articles and said adhesive coated surface of said panel, and drawing said thermoplastic sheet into skinlike engagement with said articles and said panel by the application of suction to the surface of said porous panel oppositely disposed to the partially coated surface thereof.

2. A process for the packaging of articles comprising the steps of applying a noncontinuous layer of heat-sensitive adhesive to a surface of a porous panel, placing at least one article to be packaged on said panel surface having said adhesive thereon, at least a portion of said surface disposed beneath said article being air-permeable, heating said panel until said adhesive is plastic, draping a heated thermoplastic sheet over the surfaces of said article and the adhesive-bearing surface of said panel, and applying suction to the bottom of said porous panel whereby said thermoplastic sheet is drawn into tight engagement with said articles and said adhesive-bearing surface of said panel.

3. A process for the packaging of articles comprising the steps of applying a noncontinuous layer of adhesive to a surface of a porous supporting object, placing at least one article to be packaged on said adhesive coated surface, at least a portion of said surface disposed beneath said article being air-permeable, draping a plastic sheet over said article and said adhesive coated surface of the porous supporting object, and applying suction to the surface of said porous supporting object opposed to said adhesive coated surface whereby said plastic sheet is drawn into tight engagement with said article and a portion of the surface of said supporting object having said article disposed thereon.

4. A process for the packaging of articles comprising the steps of placing at least one article to be packaged on a surface of a porous supporting object having adhesive coated areas and noncoated areas thereon, at least a portion of said surface disposed beneath said article being air-permeable, and drawing a plastic sheet into tight engagement with said article and said surface by means of suction drawn through said porous object.

5. A process for the packaging of articles comprising the steps of applying a noncontinuous layer of adhesive to a surface of a porous support member, placing at least one article to be packaged on said coated surface, at least a portion of said surface disposed beneath said article being air-permeable, draping a heated thermoplastic sheet over said article and the partially coated surface, forming a fluid seal between the periphery of said partially coated surface and said overlying plastic sheet, and withdrawing the atmosphere from between said thermoplastic sheet and said partially coated surface by means of suction applied to the surface of said porous support member oppositely disposed to said partially coated surface, whereby said thermoplastic sheet is drawn into tight engagement with said article and said partially coated surface.

6. A process for the packaging of articles comprising the steps of applying adhesive to only a portion of the surface area of a porous supporting object, placing at least one article to be packaged on the partially coated surface of said object, at least a portion of said surface disposed beneath said article being air-permeable, draping a heated thermoplastic sheet over said article and said partially coated surface, withdrawing the atmosphere from between said plastic sheet and said partially coated surface by means of suction applied to the surface of said supporting object oppositely disposed to said partially coated surface, releasing the vacuum and allowing the resulting article to cool.

7. A process for the packaging of articles comprising the steps of coating a surface of a porous support member with a discontinuous layer of heat-sensitive adhesive, positioning an article to be packaged on said surface, at least a portion of said surface disposed beneath said article being air-permeable, heating a thermoplastic sheet, draping the same over said article and said partially coated surface, fluidizing said adhesive by means of said heated thermoplastic sheet, applying suction to the underside of said partially coated surface whereby the atmosphere is withdrawn from between said thermoplastic sheet and said coated surface and said thermoplastic sheet is drawn into tight engagement with said article and said partially coated surface, releasing the suction, and allowing said resulting package to cool.

8. A process for the packaging of articles comprising the steps of placing at least one article to be packaged on the surface of a porous supporting member, applying a noncontinuous layer of adhesive to the remaining exposed portions of said surface, draping a heated thermoplastic sheet over said articles and said adhesive coated surface of said panel, and drawing said thermoplastic sheet into skinlike engagement with said article and said panel surface by exhausting the atmosphere between said thermoplastic sheet and said panel surface through the interstices in said panel.

9. A process for the packaging of articles comprising the steps of placing at least one article to be packaged on the surface of a porous supporting member, applying adhesive to the remaining exposed portions of said surface, draping a heated thermoplastic sheet over said articles and said adhesive coated surface of said panel, and drawing said thermoplastic sheet into skinlike engagement with said article and said panel surface by exhausting the atmosphere between said thermoplastic sheet and said panel surface through the interstices in said panel.

10. A process for the packaging of articles comprising the steps of applying a continuous layer of adhesive to a surface of a porous panel, removing part of said adhesive layer whereby uncoated areas are formed on said surface, placing at least one article to be packaged on said panel surface having adhesive thereon, at least a portion of said surface disposed beneath said article being air-permeable, draping a heated thermoplastic sheet over said articles and said adhesive coated surface of said panel, and drawing said thermoplastic sheet into skinlike engagement with said articles and said panel by the application of suction to the surface of said porous panel oppositely disposed to the partially coated surface thereof.

References Cited in the file of this patent

UNITED STATES PATENTS

| | | |
|---|---|---|
| 1,350,294 | Brown et al. | Aug. 25, 1920 |
| 2,005,039 | Kayner | June 18, 1935 |
| 2,124,711 | Rowell | July 26, 1938 |
| 2,313,696 | Yates | Mar. 9, 1943 |
| 2,667,019 | Feyrer | Jan. 26, 1954 |
| 2,668,403 | Rumsey | Feb. 9, 1954 |
| 2,682,138 | Sax | June 29, 1954 |
| 2,690,593 | Abercrombie | Oct. 5, 1954 |
| 2,750,719 | Wandelt | June 19, 1956 |